United States Patent [19]

Dold

[11] 4,306,244

[45] Dec. 15, 1981

[54] SPEED RECORDING DEVICE

[75] Inventor: Berthold Dold, Schramberg, Fed. Rep. of Germany

[73] Assignee: Kienzle Apparate GmbH, Villingen, Fed. Rep. of Germany

[21] Appl. No.: 105,987

[22] Filed: Dec. 21, 1979

Related U.S. Application Data

[63] Continuation of Ser. No. 907,410, May 18, 1978, abandoned.

[30] Foreign Application Priority Data

May 26, 1977 [DE] Fed. Rep. of Germany ....... 2723710
Aug. 27, 1977 [DE] Fed. Rep. of Germany ....... 2738708

[51] Int. Cl.³ ........................................... G01D 15/24
[52] U.S. Cl. ................... 346/139 R; 346/121
[58] Field of Search .......... 346/18, 33 D, 121, 139 R, 346/115

[56] References Cited

U.S. PATENT DOCUMENTS 2,933,363 4/1960 Riegger ................... 346/121 X
3,166,752 1/1965 Waterman ............... 346/139 A X
3,355,742 11/1967 Staubli ...................... 346/115 X
3,739,384 6/1973 Harkins ..................... 346/139 C Primary Examiner—Joseph W. Hartary
Attorney, Agent, or Firm—Toren, McGeady & Stanger

[57] ABSTRACT

In the disclosed apparatus, a slide is mounted on a guide bar for longitudinal as well as rotary motion. A recording instrument projects from the slide and a spring biases the slide about the guide bar so as to press the recording instrument against the record carrier. The speed measuring device moves the slide longitudinally on the basis of the measured speed.

7 Claims, 5 Drawing Figures

SPEED RECORDING DEVICE

This is a continuation of application, Ser. No. 907,410, filed May 18, 1978 now abandoned.

BACKGROUND OF THE INVENTION

This invention relates to recording devices, particularly for recording speeds.

In such devices, a recording sheet or other medium is moved in one direction, and a pen or other recording instrument shifts, a distance dependent on the speed being recorded, in a direction transverse to the sheet movement. In order to obtain recordings that may be properly evaluated, it is desirable that the instrument moves along an absolutely straight line over a relatively wide recording range. Known straight line motion mechanisms have hitherto not been particularly useful.

Such known recording apparatuses, of the type used in tachographs, involve a slide which carries a recording instrument mounted with at least three bearings on two guide bars. This kind of mounting results in a rather expensive device because the guide bars must be exactly parallel and the bearings sliding thereon must have as little play as possible. This is necessary to avoid skewing and winding of the slide. On the other hand, this structure introduces a substantial amount of friction with which the instrumentality must somehow cope.

In such devices, pressure actuated pin shaped recording instruments are mounted to be axially slidable along the shaft in a bracket arranged on the slide. This results in complexities and production difficulties, as well as high expenses, and subjects the device to the risk of failure. Since the friction resulting from the recording process is directed transverse to the direction of the spring action on the recording instrument, there is always the risk of the recording device being stuck on the guides. By contrast, a recording instrument which is fastened to a leaf spring mounted on the slide, exhibits no decisive advantages, either during production or thereafter, because achieving the desired recording pressure involves a substantial amount of adjustment.

An object of the invention is to avoid these disadvantages.

Another object of the invention is to improve devices of this type.

SUMMARY OF THE INVENTION

According to a feature of the invention, these objects are attained, in whole or in part, by mounting the slide on a guide bar which, apart from permitting the sliding motion, also allows for rotary motion of the slide, while the recording instrument is rigidly connected to the slide and a spring biases the slide in a rotary direction about the guide bar.

According to another feature of the invention, the slide is provided with two arms extending transverse to the guide bar. One of the arms carries the recording instrument while the other has a spring applied at an angle to the longitudinal direction of the guide bar so that a first component force acts on the slide along the sliding direction while a second component acts in a rotary direction. According to another feature, a stop is provided on the slide to limit to and fro rotary motion.

According to another feature of the invention, the spring is in the form of a leaf spring having at least one arm, one end of which is connected to the recording slide while the other end is in the form of a guide shoe resting on a plane parallel to the plane of the record carrier or sheet.

According to another feature of the invention, the leaf spring simultaneously forms an electrical contact member fastened to the arm of the slide carrying the recording device, with the contact member being elastic and in contact with resistances of the potentiometer.

In the recording arrangement according to the invention, in which the slide is mounted for rotary back and forth movement, the basic advantage of the sliding guide is retained while fewer parts are required. Its rugged design makes it most suitable for use in a vehicle. Particularly advantageous, however, is the rigid connection between the slide and the recording instrument.

The operating deficiencies, or the functional risks, of a separately mounted recording instrument, or recording means, are avoided according to the invention. Also, according to the invention, the bearings of the slide produce less friction and better operation as compared with the mounting and recording device on three or more bearing points. Apart from that, the expenses of making and mounting the parts is only a fraction of that compared to hitherto known devices. Only one guide bar has to be arranged in a suitable bearing to make and mount the slide and fasten the recording pencil, if this cannot be made as a part of the slide for certain recording purposes, and to apply a suitable spring to provide the necessary recording pressure.

According to another feature of the invention, the spring is directed to eliminate the gear plate between the slide and its driving gear. The spring is fastened to a stationary point. To prevent the recording pressure from varying with the position of the slide, suitable materials are chosen so that the friction between the leaf spring and its supporting plane may be neglected.

According to another feature of the invention, particularly suitable for measuring devices with feedback systems, the recording slide is driven by a motor in which the actual position of the recording slide is fed back to the feedback circuit of the measuring system by a potentiometer. In this case, the contact spring is a leaf spring with two members delivering the required recording pressure and also forming part of the wiper of the potentiometer.

These and other features of the invention are pointed out in the claims. Other objects and advantages of the invention will become evident from the following detailed description when read in light of the following drawings.

DESCRIPTION OF PREFERRED EMBODIMENTS

Figure 1:
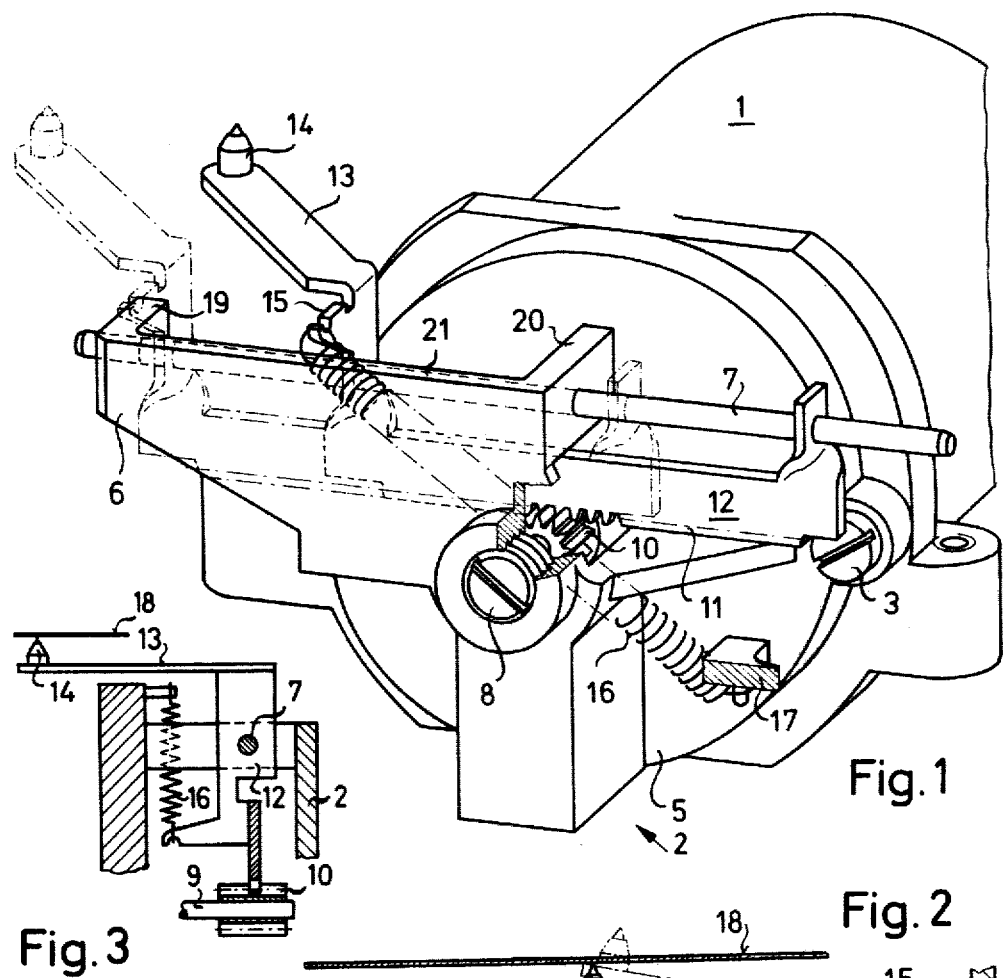
FIG. 1 is a perspective view of a recording system embodying features of the invention.
Figures 2, 3:
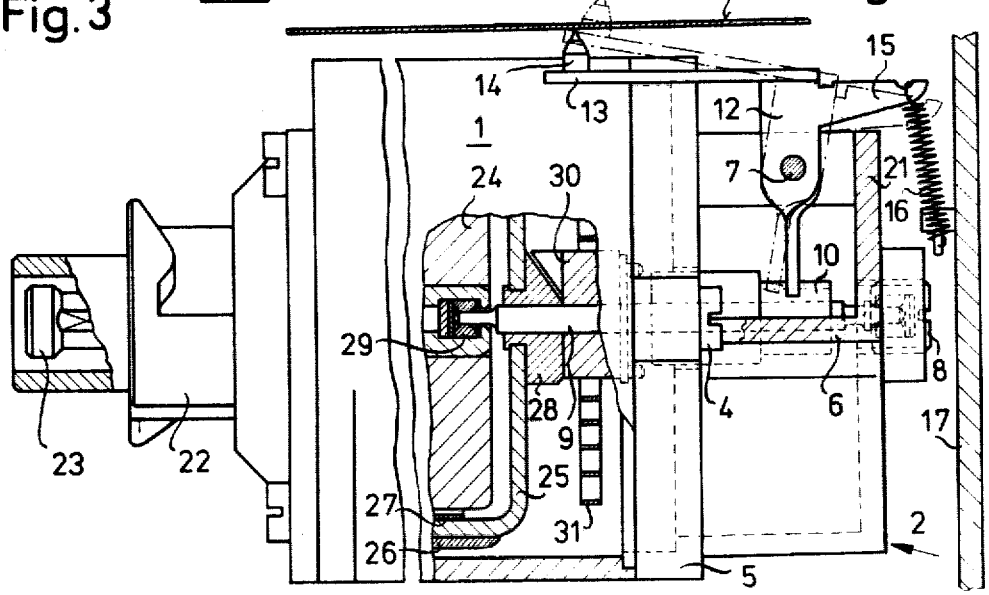
FIG. 2 is an end view of the system in FIG. 1.
FIG. 3 is a partly sectional view of a portion of another embodiment of the invention.

In FIGS. 1 and 2, the housing 1 of a measuring system is fastened to a bracket 2 by means of screws 3 and 4.

The bracket 2 is composed essentially of a flange 5 and a bearing 6. A guide bar 7 and a connecting screw 8 is fastened to the bracket 2. The screw supports a bearing for the measuring shaft 9, as is seen more distinctly from FIG. 2, and a gear wheel 10 fastened on the shaft 9. The wheel 10 engages the teeth 11 on a slide 12 which is slidably arranged on the guide bar 7. The slide 12, in the embodiment shown, is bent, and terminates in a first arm 13 which carries a recording member or pen 14. Another arm 15 projects from the side 12 in the direction opposite to the arm 13. A spring 16 whose one end is connected to the housing 17 of the recording device draws the arm 15 downwardly as shown in FIG. 2. The angle of the spring 16 relative to the axis of the guide bar 7, is such that one component force upon the slide 12 biases the latter axially along the sliding direction on the bar 7. This eliminates any gear play between the wheel 10 and the teeth of the slide 12. A second component force acts on the arm 15 to bias the slide 12 about the guide bar 7. This presses the recording pencil 14 against a record carrier 18 as shown in FIG. 2, or in the absence of the record carrier projects the recording means 14 upwardly beyond the potential position of the carrier 18. In this manner, the spring 16 not only serves to eliminate gear play but also to deliver the recording pressure.

A frame portion 21 of the bearing bracket 6 between the two projections 19 and 20 limits the rotary movement of the arm 15 on the slide 20, when, for example, the record carrier is being changed.

This extremely simple design makes it possible to overcome the requirement of a very exact engagement between the slide 12 and its driving gear. The recording arrangement according to the invention achieves this result only when the recording pencil 14 properly rests on the record carrier 18 and the latter limits the rotary motion of the slide 12 in one direction. This, however, has not been disadvantageous to the quality of recordings.

For a more complete understanding it should be noted that the aforementioned recording arrangement is fastened to a so-called eddy current measuring system whose housing 1 is adapted to receive a flexible shaft through a clutch mechanism 22. The eddy current system is driven by a shaft 23 coupled to a multi-polar permanent magnet 24. The eddy current system also includes an eddy current cup 25 having a magnetic return ring and a temperature compensating portion 27. A bushing 28 fastens the cup 25 to the measuring shaft 9. A second bearing 29 for the shaft 9 is arranged in the drive shaft 23. The shaft 9 also carries a bushing 30 which holds the internal end of a spiral return spring 31. The external end of the spring is secured to a suitable position in the housing 1 in a known manner.

According to the invention, the recording device as described can be connected as a structural unit, or structural group, to any other measuring system which supplies its output value to a gear fastened to its output shaft. According to another embodiment of the invention, the stationary end of the spring 16 is secured to the mounting bracket 2 and the bearing of the measuring shaft 9, is not arranged at the bracket 2, but at the housing of the measuring system. This arrangement may be considered "a flying mounting" for the gear wheel 10.

In the embodiment shown, the slide 12 is a bent plate member. According to another embodiment of the invention, the slide 12 may be produced as a casting. According to another embodiment of the invention, the recording instrument 14 is mounted immediately on the slide 12.

According to another embodiment of the invention, the slide 12 is shape so that its two arms 13 and 15 extend in the same direction. The spring 16 is arranged so that the direction of torque at the slide 12 remains unchanged. The component force at the spring 16 which acts in the sliding direction of the slide operates in the same direction as the return spring or against it, but in such a manner that it overcomes the mounting and recording friction. The principle of such an arrangement is shown in FIG. 3. It achieves more favorable frictional conditions between the slide 12 and the guide bar 7 with the prevailing recording pressure, i.e., that is, it reduces the load on the bearing parts of the slide 12.

Figure 4:
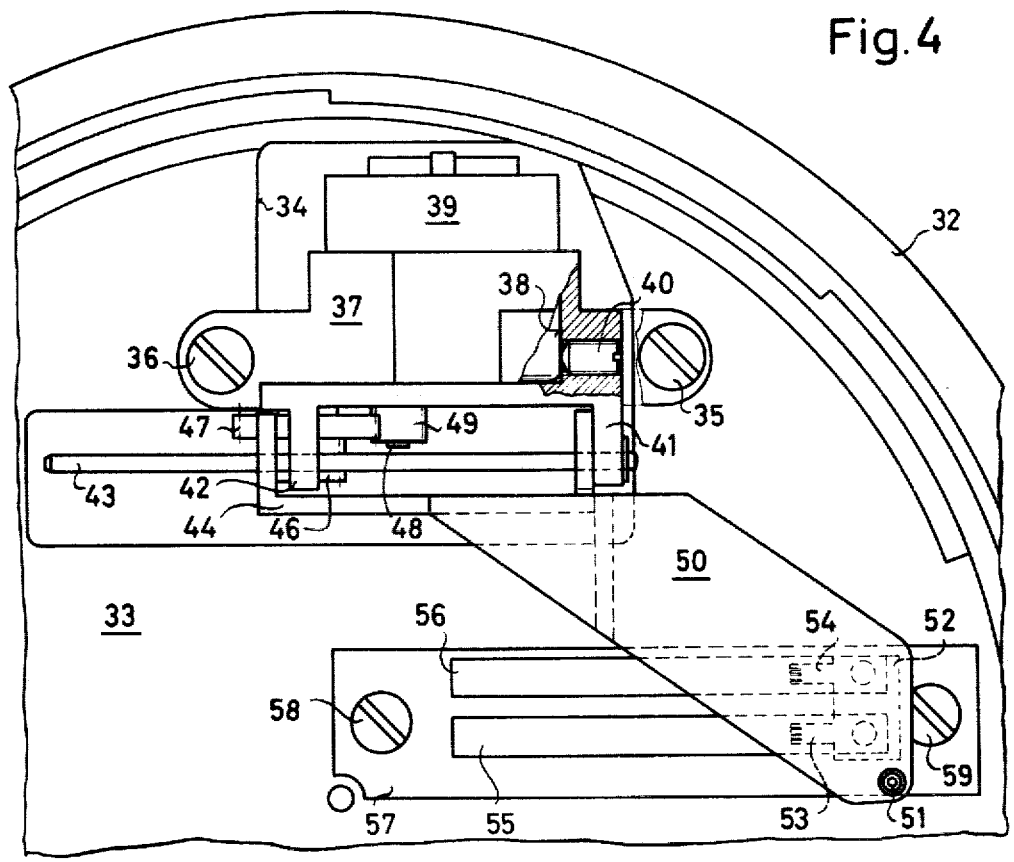
FIG. 4 is a plan view of still another embodiment of the invention.
Figure 5:
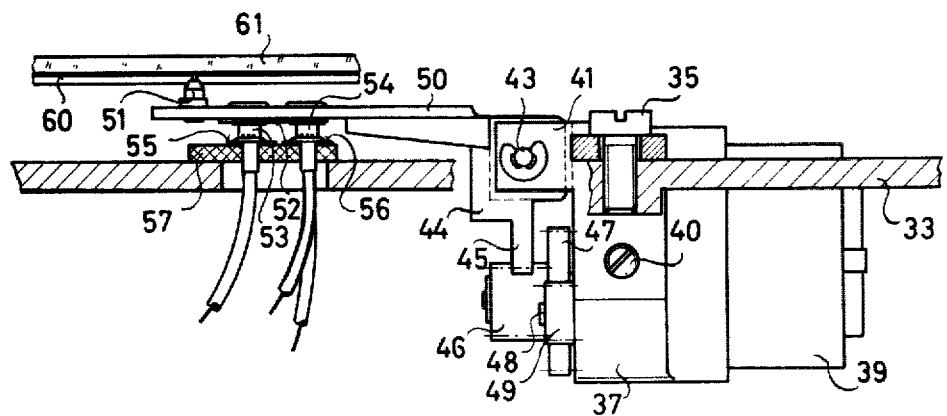
FIG. 5 is an elevational detail of a portion of the embodiment in FIG. 4.

FIGS. 4 and 5 shown another embodiment of the recording arrangement according to the invention as applied to an electrical speed measuring device operating as a feedback system. A housing 32 of the corresponding speed measuring device is provided with a mounting plate 43 and a support 37 fastened by means of screws 35 and 36 adjacent an opening 34. At the support 37 there is an opening 38 through which an electric motor 39 may be inserted to act as a feedback element. The motor is fastened by means of a clamping screw 40. On the other hand, the support is provided with two extensions 41 and 42 which serve to hold a guide bar 43.

Mounted on the guide bar 43 is a bracket-shaped recording slide 44 which is axially slidable and rotatable about the guide bar 43. The recording slide 44 is provided with a drive portion 45 having teeth which engage a gear 49 on a motor shaft 48 through intermediate gears 46 and 47. An arm 50 on the recording slide 44 carries a recording member 51. A contact bridge 52 is connected to the arm 50 which has two resilient metal contact fingers 53 and 54. These fingers contact respective resistor lines 55 and 56. Therefore, they form potentiometers transforming the position of the recording slide into an electrical value. The resistor lines 55 and 56 are fastened on an insulating plate 57. Screws 58 and 59 mount the plate 57 on a mounting portion 33.

The resilience of the electrical contact fingers 53 and 54 is such that they also deliver recording pressure by rotating the recording slide 44 and the recording pencil 51 against a recording layer 60 on the record carrier 61 as is more easily noticeable from the details of FIG. 5.

While specific embodiments of the invention have been shown and described in detail to illustrate the application of the inventive principles, it will be understood that the invention may be embodied otherwise without departing from such principles.

What is claimed is:

1. For recording the output of a speed measuring apparatus on a record carrier moving in a given direction, a recording device comprising: a guide bar, a slide, recording means, gear means coupling the speed measuring device to the slide and exhibiting slack therein, said slide being mounted on said guide bar for sliding movement along the bar as well as rotary movement, said recording means being mounted on said slide, said slide being linearly movable transverse to the moving direction of the record carrier and carrying said recording means so that the recording means can be held against the record carrier, spring means being coupled to the slide and angularly oriented simultaneously to bias the slide rotationally about the guide bar against the record carrier and longitudinally along the guide bar to bias the slide sufficiently to eliminate the slack in the gear means.

2. A device as in claim 1, wherein said slide includes a plurality of arms extending transverse to the guide bar, one of said arms carrying said recording means said spring means including a spring, said spring connected to the other of said arms, said spring extending at an angle to the longitudinal direction of the guide bar to form a component force in the longitudinal as well as rotary direction, and stop means to limit the rotary motion of the slide.

3. A recording device as in claim 2, wherein said arms are substantially rigid relative to said spring.

4. A device as in claim 1, wherein said slide includes an arm extending away from the guide bar and carrying said recording means transverse thereto so that rotary bias of the slide by the spring means biases the recording means against the record carrier.

5. A device as in claim 4, wherein said slide has a second arm extending from the guide bar in a direction opposite the first arm, said spring means being secured to the second arm for biasing the second arm away from the record carrier.

6. For recording the output of a speed measuring apparatus on a record carrier moving in a given direction, a recording device comprising: a guide bar, a slide, recording means, and spring means for applying a resilient force, said slide being linearly movable transverse to the moving direction of the record carrier and coupled to the speed measuring device and carrying said recording means while holding the recording means against the record carrier, said slide being mounted on said guide bar for sliding movement as well as rotary movement, said recording means being rigidly connected to said slide while said spring means is coupled to said slide and biases said slide rotationally bout said guide bar and said recording means against the carrier, said spring means including a leaf spring, the end of the spring being fastened to said slide while the other end forms a guide shoe resting on a plane parallel to the plane of the record carrier.

7. A recording device as in claim 6, wherein the leaf spring forms a contact element, a potentiometer in contact with said contact element, said leaf spring being fastened to the arm of the slide which carries the recording means.

* * * * *